US009154365B1

(12) United States Patent
Henry

(10) Patent No.: US 9,154,365 B1
(45) Date of Patent: Oct. 6, 2015

(54) REPLAYING EVENTS COLLECTED FROM A CLIENT COMPUTER

(75) Inventor: Brent E. Henry, Salt Lake City, UT (US)

(73) Assignee: Raytheon Oakley Systems, LLC, Salt Lake City, UT (US)

( * ) Notice: Subject to any disclaimer, the term of this patent is extended or adjusted under 35 U.S.C. 154(b) by 2757 days.

(21) Appl. No.: 11/556,968

(22) Filed: Nov. 6, 2006

Related U.S. Application Data

(60) Provisional application No. 60/734,811, filed on Nov. 8, 2005.

(51) Int. Cl.
*G06F 15/173* (2006.01)
*H04L 29/08* (2006.01)

(52) U.S. Cl.
CPC .............................. *H04L 29/08072* (2013.01)

(58) Field of Classification Search
USPC ........................................................ 709/224
See application file for complete search history.

(56) References Cited

U.S. PATENT DOCUMENTS

| | | | |
|---|---|---|---|
| 6,099,317 A * | 8/2000 | Bullwinkel et al. ........... 434/118 |
| 6,543,011 B1 * | 4/2003 | Schumacher et al. .......... 714/45 |
| 6,772,107 B1 * | 8/2004 | La Cascia et al. ............. 703/21 |
| 6,801,224 B1 * | 10/2004 | Lewallen ...................... 715/746 |
| 6,832,367 B1 * | 12/2004 | Choi et al. .................... 717/130 |
| 6,976,218 B2 * | 12/2005 | Stanford-Clark ............. 715/744 |
| 7,730,011 B1 * | 6/2010 | Deninger et al. ............. 707/602 |
| 2003/0053420 A1 * | 3/2003 | Duckett et al. ................ 370/252 |
| 2003/0101235 A1 * | 5/2003 | Zhang ........................... 709/218 |
| 2005/0060719 A1 * | 3/2005 | Gray et al. .................... 719/318 |
| 2005/0071760 A1 * | 3/2005 | Jaeger ........................... 715/705 |
| 2007/0050844 A1 * | 3/2007 | Lebel ............................. 726/13 |

* cited by examiner

*Primary Examiner* — Esther B Henderson
(74) *Attorney, Agent, or Firm* — Schwegman Lundberg & Woessner, P.A.

(57) ABSTRACT

Embodiments of the invention provide novel systems, methods and software for replaying one or more events occurring on a monitored computer (or elsewhere). Such solutions can provide the ability for an operator to easily determine the exact user behavior that produced the event and can, in some cases, and provide evidence of what the user did, and the order in which the user performed the various activities. Various embodiments of the invention organize various pieces of information captured from the user's client workstation behavior, reassemble of the pieces into a complete session of the users' activities and/or replay the exact user behavior for the observer, in some cases using a web browser and JavaScript to replay the activities just as they were performed by the original user.

25 Claims, 10 Drawing Sheets

REPLAYING EVENTS COLLECTED FROM A CLIENT COMPUTER

CROSS-REFERENCE TO RELATED APPLICATIONS

The present disclosure may be related to the following commonly assigned applications/patents:

This application claims priority from commonly-assigned provisional U.S. Patent Application No. 60/734,811, entitled "Replaying Events Collected from a Client Computer," and filed Nov. 8, 2005 by Henry.

This application is related to commonly-assigned U.S. patent application Ser. No. 11/556,942, entitled "Event Monitoring and Collection," and filed on a date even herewith by Clingenpeel et al., which claims priority from provisional U.S. Patent Application 60/734,886, entitled "Event Monitoring and Collection," and filed Nov. 8, 2005 by Clingenpeel et al.

This application is related to commonly-assigned U.S. patent application Ser. No. 11/557,007, entitled "Keyword Obfuscation," and filed on a date even herewith by Henry et al., which claims priority from provisional U.S. Patent Application 60/734,909, entitled "Keyword Obfuscation," and filed Nov. 8, 2005 by Henry et al.

This application is related to commonly-assigned U.S. patent application Ser. No. 11/557,025, entitled "Cache for Collecting Events on a Monitored Computer," and filed on a date even herewith by Clingenpeel et al., which claims priority from provisional U.S. Patent Application 60/734,887, entitled "Cache for Collecting Events on a Monitored Computer," and filed Nov. 8, 2005 by Clingenpeel et al.

This application is related to commonly-assigned U.S. patent application Ser. No. 11/556,984, entitled "Validation of Social Security Numbers," and filed on a date even herewith by Rogers, which claims priority from provisional U.S. Patent Application 60/734,812, entitled "Validation of Social Security Numbers," and filed Nov. 8, 2005 by Rogers.

This application is related to commonly-assigned U.S. patent application Ser. No. 11/557,047, entitled "Monitoring and Collection of Audio Events," and filed on a date even herewith by Neath et al., which claims priority from provisional U.S. Patent Application 60/734,911, entitled "Monitoring and Collection of Audio Events," and filed Nov. 8, 2005 by Neath et al.

The respective disclosures of these applications/patents are incorporated herein by reference in their entirety for all purposes.

FIELD OF THE INVENTION

The present invention relates to computer systems in general and in particular to systems, methods and software for replaying events collected from a monitored computer system.

BACKGROUND OF THE INVENTION

Often, it is of interest to monitor and/or collect events from a monitored computer system, as described, for example, in U.S. patent application Ser. No. 11/556,942, already incorporated by reference. This functionality is of limited use, however, without a facility to replay the events to see the user actions that generated the events.

Various products and offerings are available for capturing the activities of a user on a client workstation, analyzing the captured information and determining if the user is engaged in undesirable, proscribed or illegal behavior. The offerings fall into two broad categories: those that capture information at some central network gateway: and those that capture information directly from the client workstation through the use of an agent on the client. In both cases the captured information generally is analyzed for indications of proscribed activities and an alert or report made to some authorized observer.

The observer is then provided with reports and/or logs about the suspect behavior from which the observer attempts to determine the precise nature and order of the activities, using the activity details in the logs provided by the system. The system assists by providing various levels of reconstruction and reassembly of the user's sessions of activity.

However the task of reconstructing the user's behavior is analogous to being given a log of all of the commingled scripts for the concurrent television programs being broadcast and asked to pick out the plot of just one of the programs. This presents, at the least, a difficult and time-consuming task.

Another solution is to provide an application for "replaying" such events, allowing an operator to experience the events generally as would the user who generated them. In many cases, attempts at replaying captured web and other client workstation activity have relied upon programmatic solutions that simulate the capabilities of a web browser. One exemplary solution of this type is product example is the Speed-Trap™ product from the IS Solutions in the UK, which captures client workstation activity and used a Microsoft Visual Basic™ application to simulate the browser capabilities and replay the captured information.

Other attempts have been undertaken with Java and C++ programs to simulate the browser and to replay the collected information. Each of these attempts has suffered from the inability of the simulation programs to handle the full range of capabilities and variations found in modern web browsers. Each approach has provided a limited range of compatibility and a tendency to break when encountering complex or unexpected data structures or sequences that are handled by today's sophisticated web browsers.

BRIEF SUMMARY OF THE INVENTION

Embodiments of the invention provide novel systems, methods and software for replaying one or more events occurring on a monitored computer (or elsewhere). Such solutions can provide the ability for an operator to easily determine the exact user behavior that produced the event and can, in some cases, provide evidence of what the user did, and the order in which the user performed the various activities. Various embodiments of the invention organize various pieces of information captured from the user's client workstation behavior, reassemble the pieces into a complete session of the users' activities and/or replay the exact user behavior for the observer, in some cases using a web browser and JavaScript to replay the activities just as they were performed by the original user.

In a set of embodiments, the client computer comprises one or more application programs, each of which can generate a plurality of events (often, but not always, in response to user actions), which might include, merely by way of example, a first event and a second event. The client computer also includes, in some cases, a monitoring agent, which might be configured to collect a first representation (which might represent the first event) and/or a second representation (which might represent the second event). The client computer also comprises, in some embodiments, a transfer agent, which is configured to transmit the first representation and/or the second representation for reception by the replay server. (In some cases, the functionality of the transfer agent is incorporated in the monitoring agent.)

The replay server, which in many embodiments is in communication (although perhaps intermittently) with the client computer, comprises a processor. The replay server might also comprise a storage medium on which there is stored a data structure, which might be configured to store representations of events collected from one or more client computers. The replay server often will also comprise a set of instructions.

The set of instructions might comprise instructions to receive the first and/or second representations from the client computer and/or instructions to store the first representation and/or the second representation within the data structure. In some embodiments, the set of instructions further comprises instructions to provide (perhaps upon request) a first event object and/or a second event object to a replay workstation. Merely by way of example, the first event object might comprise data used to replay the first event, and/or the second event object might comprise data used to replay the second event.

The replay workstation, which in some embodiments is in communication with a replay server, might also comprise a processor and/or a set of instructions. The set of instructions on the replay workstation can comprise instructions to identify a collection of events to replay. The collection of events may comprise the first event and the second event. The set of instructions might further comprise instructions to establish a set of windows, which can be, merely by way of example, a set of JavaScript iFrames in a JavaScript-enabled web browser) associated with the collection of events to replay. In a particular embodiment, the set of windows can comprise a content window, an event window and/or a control window (which may comprise, respectively a content iFrame, an event iFrame, and a control iFrame). In some embodiments, there may be instantiated a source information window (which may also be an iFrame), which can provide a set of tools to control a replay of the first and second events.

The set of instructions on the replay workstation further comprises, in some embodiments, instructions to retrieve from the replay server the first event object, perhaps using the control window; instructions to store the first event object in an event queue in the event window; and/or instructions to replay the first event in the content window. Similarly, in certain embodiments, the set of instructions further comprises instructions to retrieve from the replay server the second event object (again, perhaps using the control window); instructions to store the second event object in the event queue; and/or instructions to replay the second event in the content window.

Another set of embodiments provides methods, including without limitation methods that can be implemented on systems of the invention and/or in software programs of the invention. An exemplary method of replaying one or more events (which may have been collected from a client computer) might comprise identifying an event to replay. (In some cases, this might comprise identifying a collection of events to replay, the collection of events comprising a plurality of events comprising a first event and, perhaps a second event). The method may further comprise instantiating (e.g., at a replay workstation) a control window for requesting events objects from an event source, and/or requesting (e.g., via the control window), an event object. The event object might comprise data used to replay the first event.

In some embodiments, the method further comprises instantiating an event window, which can be used to store the first event object, receiving the first event object from the event source and/or storing the first event object (e.g., in an event queue in the event window). In some cases, a content window (which can be configured to replay the event) is instantiated, and/or the event is replayed (e.g., in the content window). The replay of the event may be based on the event object.

In another set of embodiments, a method of replaying a plurality of objects might comprise identifying a collection of events to replay (the collection of events comprises a plurality of events), instantiating at a replay workstation a control window (e.g., for requesting event objects from an event source), and/or requesting (e.g., via the control window) a plurality event objects. Each of the plurality of event objects might comprise data used to replay one of the plurality of events.

The method further comprises, in accordance with some embodiments, instantiating an event window for storing the plurality of event objects, receiving the plurality of event objects from the event source, and/or storing each of the plurality of event objects (e.g., in the event window). In some cases, the method comprises instantiating a content window (which might be configured to replay the plurality of events) and/or replaying the plurality of events. In an aspect of some embodiments, the replay of each of the plurality of events is based upon one of the plurality of event objects.

As noted above, a set of embodiments comprises systems, including without limitation systems configured to implement methods of the invention. Another exemplary system for replaying one or more of a plurality of events (which may have been collected from a client computer) comprises a computer (which might be a replay workstation) comprising a processor and a set of instructions executable by the processor.

The set of instructions might comprise instructions to identify an event to replay and/or to instructions to instantiate a control window for requesting events objects from an event source. Further instructions might request (e.g., via the control window), an event object, which might comprise data used to replay the event. The set of instructions, in some embodiments, also comprises instructions to instantiate an even window, which can be used to store the event object, to receive the event object from the event source and/or to store the event object (e.g., in an event queue, which might be in the event window). In various embodiments, the set of instructions includes further instructions to instantiate a content window (which may be configured to replay the event) and/or to replay the event, perhaps based on the event object.

Yet another set of embodiments provides software programs, including without limitation software programs comprising instructions to implement methods of the invention and/or software programs that can be implemented on systems of the invention. Some software programs may be embodied on a computer readable medium.

An exemplary software program comprises a set of instructions executable by one or more computers. The set of instructions might comprise instructions to identify an event to replay and/or to instructions to instantiate a control window for requesting events objects from an event source. Further instructions might request (e.g., via the control window), an event object, which might comprise data used to replay the event. The set of instructions, in some embodiments, also comprises instructions to instantiate an event window, which can be used to store the event object, to receive the event object from the event source and/or to store the event object (e.g., in an event queue, which might be in the event window). In various embodiments, the set of instructions includes further instructions to instantiate a content window (which may be configured to replay the event) and/or to replay the event, perhaps based on the event object.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
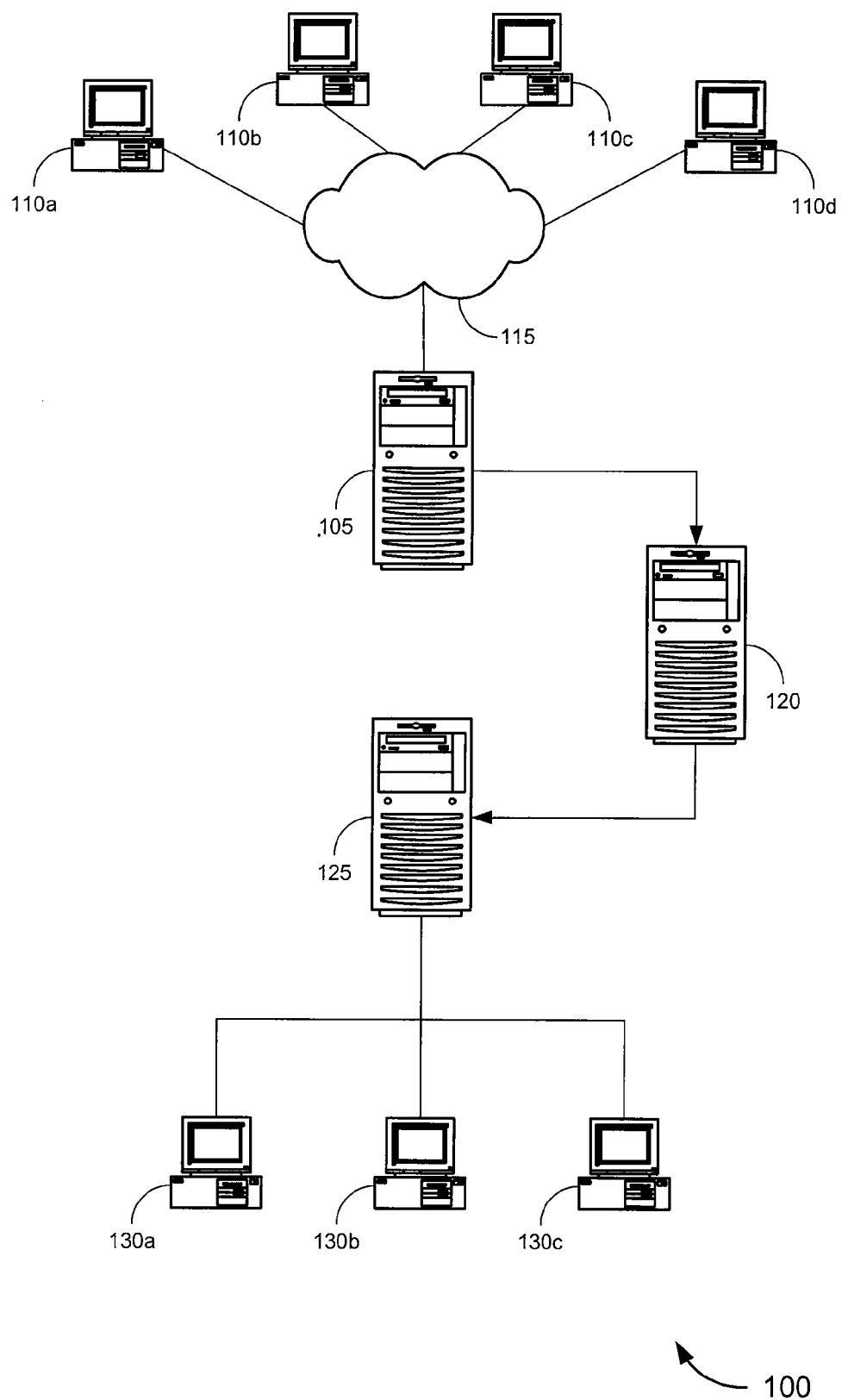
FIG. 1 is a generalized schematic illustrating various components of a replay system, including an information flow between such components, in accordance with various embodiments of the invention.

Embodiments of the invention provide novel systems, methods and software for replaying one or more events occurring on a monitored computer (or elsewhere). Such solutions can provide the ability for an operator to easily determine the exact user behavior that produced the event and can, in some cases, and provide evidence of what the user did, and the order in which the user performed the various activities. Various embodiments of the invention organize various pieces of information captured from the user's client workstation behavior, reassemble of the pieces into a complete session of the users' activities and/or replay the exact user behavior for the observer, in some cases using a web browser and JavaScript to replay the activities just as they were performed by the original user.

Merely by way of example, a replay system in accordance with some embodiments of the invention comprises a replay server having a data store configured to hold a plurality of event objects. Each of the plurality of event objects comprises data used to replay an event that occurred on a monitored computer. (Examples of systems and methods that can be used to obtain events—or, more precisely, representations thereof—from a monitored computer can be found in U.S. patent application Ser. No. 11/556,942, already incorporated by reference. Such data can include, without limitation, instructions and/or parameters that can be used by a JavaScript replay engine to recreate the event, including, in some cases HTML that can be parsed by a browser to create a web page for displaying the event.

This exemplary replay system further comprises a replay workstation. The replay workstation comprises a replay engine, which, in this embodiment is a JavaScript application designed to run inside of a JavaScript-compatible web browser (of which there are many, including merely by way of example, Microsoft's Internet Explorer™ browser and Mozilla's Firefox™ browser). In operation, an observer (that is, a person who desires to view a replay of one or more events), identifies a collection of events to replay (for example, by selecting a link on a page displayed by the browser—the link may comprise a uniform resource locator ("URL") referencing an object collection on the replay server).

Upon selection of the link, the replay server downloads to the browser the replay engine JavaScript. The replay engine then instantiates a set of JavaScript iFrames (a concept familiar to those skilled in the art), comprising a content iFrame, an event iFrame, a control iFrame, and a source information iFrame. The control iFrame is used to request from the replay server an event object that corresponds to the first event to be replayed (and/or in some cases, a plurality of event objects, which might be part of a common collection, in order to ensure the event queue has sufficient event objects to avoid delay of the replay). The replay server then transmits the first event object to the replay workstation, where it is stored in an event queue in the event iFrame (e.g., as a set of HTML and/or parameters executable by the replay engine to reproduce the event).

The replay engine then processes the data in the event queue (that is the data from the first event object) to replay the event in the content window. In certain embodiments, the event might comprise a set of HTML and/or other online resources, such as a web page visited by the user, and a URL to the server for a page containing that HTML can be provided to the content window as the source URL for the content page. In this way, for example, the content window can load the set of HTML prior to executing events that occurred at the monitored computer with respect to the set of HTML. This set of HTML can be provided to the replay server either by a monitoring agent on the monitored computer and/or can be downloaded from its source by the replay server, for instance based on information received from the monitoring agent.

In a certain set of embodiments, the set of HTML might comprise one or more URLs to other web pages, and those other web pages can also be obtained by the replay server in similar fashion. In a particular embodiment, URLs to such other web pages can be replaced (in the set of HTML provided to the content window) by URLs to the content obtained by the replay server. In this way, for example, the content of the web pages can be protected against change, so that the event, when replayed will be consistent with the event as it happened on the monitored computer.

As described in further detail below, in some cases, the replay server (and/or replay engine) is configured to strip from the event object (and/or the set of HTML) any extraneous HTML and/or JavaScript commands that are not necessary to the replay of the event. In this way, the event object (and/or set of HTML) can be conditioned to prevent the execution of any extraneous data, which could interfere with the replay of the event.

In many cases, a number of events may be grouped in an event collection (which generally, but not always, will comprise a set of related events). An example of an event collection might be a set of events including the load of an HTML page, a mouse click event on a "login" link on the HTML page, the load of a login HTML page, the entry of text in a userid field, the entry of text in a password field, and a mouse click event on an "login" button on the login HTML page. These events may be grouped into a collection because, collectively, they represent an operation of a user logging into a web site. (The grouping of events into collections can be performed in any suitable manner and is beyond the scope of this discussion—all that is necessary here is to understand that embodiments of the invention can support the concept of event collections.) Likewise, multiple events collections can be contained within a session container. An exemplary data structure for organizing events and event collections is described in U.S. patent application Ser. No. 11/557,025, already incorporated by reference.

Hence, in a set of embodiments, multiple events within an event collection may be replayed. Merely by way of example, if an observer selects an event collection for replay, the first event in the collection will be replayed as described above. When the replay engine detects that the event queue is becoming empty (and/or has sufficient space to accept one or more new event objects), the control iFrame will request additional event objects, which will be added to the event queue (generally in sequential fashion, according to the order in which they occurred originally, for example).

In some cases, it may be desirable to replay multiple collections of events (each of which may have occurred simultaneously and/or isochronously at the monitored computer). In this case, the replay engine may instantiate another set of iFrames (control, event, and content) to replay a second collection of events. The event objects from each collection may be provided in synchronized fashion, such that the events in each collection are replayed, relative to each other, in the chronological order in which they occurred at the monitored computer. This process may be facilitated by identifiers (which may be sequential) and/or timestamps associated with various representations of events (and/or with various event objects). Additionally and/or alternatively, as described in more detail below, the timing of the replay can be adjusted, such that the collective replay of a set of events is faster (and/or slower) than the actual occurrence of that set of events at the monitored computer.

In some cases, then, the replay engine further instantiates a source information iFrame, which can include information about replayed events and/or a set of controls (which may analogous to standard VCR controls) for controlling a replay. Such controls can include, merely by way of example, play, pause, stop, fast forward, rewind, frame advance, scan (forward and/or backward) and/or the like.

The above example illustrates the operation of an exemplary embodiment. As described in more detail below, many variations are possible among the various embodiments of the invention. Embodiments of the invention, therefore, provide a variety of systems, methods and/or software for replaying events. (It should be noted that, while various embodiments are described with—or without—certain features for ease of description and to illustrate exemplary features, the various components and/or features described herein with respect to a particular embodiment can be substituted, added and/or subtracted from among other described embodiments, unless the context dictates otherwise.)

One set of embodiments, for example, provides systems, including without limitation systems for collecting and/or replaying events. An exemplary system for collecting and replaying events comprises a client computer, which may be monitored for events. Examples of client computers are described more fully in U.S. patent application Ser. No. 11/556,942, already incorporated by reference. This exemplary system also includes a replay server and a replay workstation.

In a set of embodiments, the client computer comprises one or more application programs, each of which can generate a plurality of events (often, but not always, in response to user actions), which might include, merely by way of example, a first event and a second event. The client computer also includes, in some cases, a monitoring agent, which might be configured to collect a first representation (which might represent the first event) and/or a second representation (which might represent the second event). As described in further detail below, events can comprise a variety of occurrences. To name but one example at this point, an event might comprise a set of HTML data and/or a set of at least one user input (such as a mouse action, keyboard input, etc.) relative to the set of HTML data.

The client computer also comprises, in some embodiments, a transfer agent, which is configured to transmit the first representation and/or the second representation for reception by the replay server. (In some cases, the functionality of the transfer agent is incorporated in the monitoring agent.)

The replay server, which in many embodiments is in communication (although perhaps intermittently) with the client computer, comprises a processor. The replay server might also comprise a storage medium on which there is stored a data structure, which might be configured to store representations of events collected from one or more client computers. The replay server often will also comprise a set of instructions.

The set of instructions might comprise instructions to receive the first and/or second representations from the client computer and/or instructions to store the first representation and/or the second representation within the data structure. In some embodiments, the set of instructions further comprises instructions to provide (perhaps upon request) a first event object and/or a second event object to a replay workstation. Merely by way of example, the first event object might comprise data used to replay the first event, and/or the second event object might comprise data used to replay the second event.

The replay workstation, which in some embodiments is in communication with a replay server, might also comprise a processor and/or a set of instructions. The set of instructions on the replay workstation can comprise instructions to identify a collection of events to replay. The collection of events may comprise the first event and the second event. The set of instructions might further comprise instructions to establish a set of windows, which can be, merely by way of example, a set of JavaScript iFrames in a JavaScript-enabled web browser) associated with the collection of events to replay. In a particular embodiment, the set of windows can comprise a content window, an event window and/or a control window (which may comprise, respectively a content iFrame, an event iFrame, and a control iFrame). In some embodiments, there may be instantiated a source information window (which may also be an iFrame), which can provide a set of tools to control a replay of the first and second events. The set of tools, in certain embodiments, can include, without limitation some or all of the following: a play control, a pause control, a fast forward control, a rewind control, a frame advance control, and a speed control.

The set of instructions on the replay workstation further comprises, in some embodiments, instructions to retrieve from the replay server the first event object, perhaps using the control window; instructions to store the first event object in an event queue in the event window; and/or instructions to replay the first event in the content window. Similarly, in certain embodiments, the set of instructions further comprises instructions to retrieve from the replay server the second event object (again, perhaps using the control window); instructions to store the second event object in the event queue; and/or instructions to replay the second event in the content window.

Another set of embodiments provides methods, including without limitation methods implemented by systems of the invention. (Merely by way of example, one or more procedures in various methods may be performed by a replay engine on a replay workstation.) An exemplary method of replaying one or more events (which may have been collected from a client computer) might comprise identifying an event to replay. (In some cases, this might comprise identifying a collection of events to replay, the collection of events comprising a plurality of events comprising a first event and, perhaps a second event). The method may further comprise instantiating (e.g., at a replay workstation) a control window for requesting events objects from an event source, and/or requesting (e.g., via the control window), an event object. The event object might comprise data used to replay the first event.

In some embodiments, the method further comprises instantiating an event window, which can be used to store the first event object, receiving the first event object from the event source and/or storing the first event object (e.g., in an event queue in the event window). In some cases, a content window (which can be configured to replay the event) is instantiated, and/or the event is replayed (e.g., in the content window). The replay of the event may be based on the event object.

In some cases, the method further comprises instantiating a source information window providing a set of tools to control a replay of the first event. In a particular set of embodiments, as described in more detail below, the control window, the event window and the content window each comprise a JavaScript iFrame.

The event source can be, inter alia, a replay server computer (as described in further detail below). Alternatively and/or in addition, the event source might be a process running on the replay workstation. That is, in certain embodiments, the functionality ascribed herein to the replay workstation and the replay server, respectively, can be provided by a single computer.

An event object can comprise any of a variety of data, but in most cases it includes data that is germane to replaying an event with which the object is associated. Merely by way of example, an event object might comprise a set of parameters defining actions a replay engine should take to replay an associated event. Alternatively and/or additionally, an event object might comprise data usable by the replay workstation to emulate an application on the client computer in which the first event occurred. (Applications which can generate events to be replayed can include, merely by way of example an electronic mail application, an office productivity application, an instant messenger application and a web browser application. In addition, events might also be generated outside of any application—e.g., in the operating system and/or shell of the monitored computer. Examples of such events are detailed below but can include, without limitation, file copy and/or transfer operations, drive mount operations, etc.).

Certain embodiments of the invention can provide various data-management features to facilitate the replay of events. Merely by way of example, in some embodiments, the method might further comprise removing from the first event object some or all commands that are unrelated to replaying of the first event, which can, for instance, prevent an extraneous command from interfering with a replay operation. As another example, if an event comprises a web page with external URLs, a method in some embodiments can include removing from the event object an external URL that references a resource at a location on the Internet and/or replacing the external URL in the first event object with a URL that references a representation of the resource at the event source (e.g., a replay server). In this way, for example, the content of a web page referenced by an external URL can be preserved against changes to that web page subsequent to the collection of the event. Alternatively and/or additionally, if an event comprises a user of the monitored computer visiting a web page, a method in accordance with certain embodiments might comprise saving (e.g., at the event source) a representation of the web page at the event source, providing to the content window a source reference (e.g., a source URL) to the representation of the web page at the event source, and/or loading, in the content window, the representation of the web page at the event source.

In certain embodiments, identifying an event to replay comprises identifying a collection of events to replay (e.g., an observer selecting a link referencing the collection of events, etc.). The collection of events might comprises a plurality of events comprising a first event (the replay of which was described above) and a second event. The method then, might further comprise requesting (e.g., via the control window,) a second event object comprising data used to replay a second event, receiving a second event object, storing the second event object in the event queue and/or replaying the second event in the content window, based on the first event object. The replay workstation might be configured to ensure that a replay of the first event and the second event preserves a chronological order between the first event and the second event, which can allow an observer to see the events in the order they occurred at the monitored computer. Alternatively and/or additionally, the replay workstation might be configured to reduce a chronological gap between the first event and the second event, such that a replay of the first and second events occurs in a relatively shorter time span than an original time span between the first event and the second event.

In an alternative set of embodiments, the second event might be part of a second collection of events that has been identified for replay. Merely by way of example, the first collection of events might comprise events associated with a first window on the monitored client computer and/or the second collection of events might comprise events associated with a second window on the monitored client computer. The first window on the monitored might be associated with a first application, and/or the second window on the monitored client might be associated with a second application.

In such embodiments, a second window set may be instantiated (e.g., by the replay engine) at the replay workstation. The second window set might comprise, merely by way of example, a second control window, a second event window and a second content window. A method might further comprise, then receiving (e.g., from the event source) a second event object comprising data used to replay the second event, storing the second event object (e.g., in the second event window) and/or replaying the second event in the second content window, perhaps based on the second event object. A source information window might comprise a set of tools to control a replay of the first event; the set of tools might also control a replay of the second event.

In some cases, a replay of the first event in the content window and a replay of the second event in the second content window are coordinated such that a temporal relationship between the first event and the second event is preserved.

In another set of embodiments, a method of replaying a plurality of objects might comprise identifying a collection of events to replay (the collection of events comprising a plurality of events), instantiating at a replay workstation a control window (e.g., for requesting event objects from an event source), and/or requesting (e.g., via the control window) a plurality event objects. Each of the plurality of event objects might comprise data used to replay one of the plurality of events. In some cases, each of the plurality of events may have occurred in a single application on a monitored client computer. In other cases, one or more of the plurality of events might have occurred in a different application.

The method further comprises, in accordance with some embodiments, instantiating an event window for storing the plurality of event objects, receiving the plurality of event objects from the event source, and/or storing each of the plurality of event objects (e.g., in the event window). In some cases, the method comprises instantiating a content window (which might be configured to replay the plurality of events) and/or replaying the plurality of events. In an aspect of some embodiments, the replay of each of the plurality of events is based upon one of the plurality of event objects. In a particular embodiment, the control window is configured to detect that an event object in the event window is being used to replay an associated event, and to request an additional event object in response to detecting that the stored event object is being used.

As described in more detail below, in some cases, replaying the plurality of events comprises compressing a set of chronological gaps between the plurality of events, such that a replay of the plurality of events occurs in a relatively shorter span of time than a span of time in which the events occurred on the client computer.

As noted above, a set of embodiments comprises systems, including without limitation systems configured to implement methods of the invention. Mother exemplary system for replaying one or more of a plurality of events (which may have been collected from a client computer) comprises a computer (which might be a replay workstation) comprising a processor and a set of instructions executable by the processor.

The set of instructions might comprise instructions to identify an event to replay and/or to instructions to instantiate a control window for requesting events objects from an event source. Further instructions might request (e.g., via the control window), an event object, which might comprise data used to replay the event. The set of instructions, in some embodiments, also comprises instructions to instantiate an event window, which can be used to store the event object, to receive the event object from the event source and/or to store the event object (e.g., in an event queue, which might be in the event window). In various embodiments, the set of instructions includes further instructions to instantiate a content window (which may be configured to replay the event) and/or to replay the event, perhaps based on the event object.

Yet another set of embodiments provides software programs, including without limitation software programs comprising instructions to implement methods of the invention and/or software programs that can be implemented on systems of the invention. Some software programs may be embodied on a computer readable medium.

An exemplary software program comprises a set of instructions executable by one or more computers. The set of instructions might comprise instructions to identify an event to replay and/or to instructions to instantiate a control window for requesting events objects from an event source. Further instructions might request (e.g., via the control window), an event object, which might comprise data used to replay the event. The set of instructions, in some embodiments, also comprises instructions to instantiate an event window, which can be used to store the event object, to receive the event object from the event source and/or to store the event object (e.g., in an event queue, which might be in the event window). In various embodiments, the set of instructions includes further instructions to instantiate a content window (which may be configured to replay the event) and/or to replay the event, perhaps based on the event object.

Turning now to FIG. 1, a system 100 in accordance with a set of embodiments comprises a monitoring server 105 The monitoring server 120 is responsible for collecting information (including representations of one or more events) from one or more monitored clients 110 on which a monitoring agent is installed. In some embodiments, the monitoring server 105 communicates via the client 110 via a network 115 (which can be an interne, intranet, LAN, WAN, VPN and/or any other appropriate network).

There are many processes for collecting such information, some of which are described in U.S. patent application Ser. Nos. 11/556,942, 11/557,007, 11/557,025 and 11/557,047, all of which already are incorporated by reference, (It should be noted that the present invention is not limited to any particular process of collecting events, so long as the events are available for replay as described herein.) The monitoring server 105, in some embodiments, indexes some or all of the collected information to identify a particular client machine (e.g., 110a) from which the information originated, the user of the client (e.g., 110a) and/or the timestamp of any collected events, and optionally stores the information into a data store on a storage server 120.

A replay server 125 may be in communication with the storage sever 120 and/or the monitoring server 105 (alternatively and/or additionally, the functionality of one or more of the servers 105, 120, 125 may be incorporated by a single server—it should be noted that the functional organization depicted by FIG. 1 is intended to be exemplary only, and that the functions described herein may be allocated among any number of computers in accordance with various embodiments of the invention). In a set of embodiments, the replay server 125 is further in communication with one or more replay workstations 130. (Communication among the server(s) 105, 120, 125 and/or the replay workstation(s) 130 may be direct communication and/or communication across a network, including without limitation any of the networks described above.)

Collectively the replay server 125 and one or more replay workstations 130 can be configured to replay an event, for example, by implementing methods of the invention. In a set of embodiments, then, the replay server 125 responds to a replay request (that is, in a typical case, a request made via a replay workstation (e.g., 130a) by an observer operating the workstation 130a). In a set of embodiments, this is accomplished by first transmitting for reception by the workstation 130a a set of instructions (which, in a particular embodiments, are JavaScript functions, which can be processed and/or executed by any JavaScript interpreter, including without limitation the interpreters often built into and/or configured to work in collaboration with a web browser—it should be appreciated, however, that the instructions, which might be any other appropriate functions and/or commands, which might be written in an interpreted and/or compiled language, such as Perl, C, C++, Python, Ruby and/or the like).

The instructions are used to control the replay. (Merely by way of example, in a set of embodiments, the instructions comprise a replay engine, which performs various methods of the invention, as described in detail herein.) The replay server 125 might also responsible for analyzing the replay requests from the replay workstation 130, retrieving from the storage server 120 the necessary data related to the requested event(s) (such data can include data about the event, which can include a representation of an event and/or an event object associated with the event, as well as information about a session and/or event collection comprising the event). In some cases, the replay server 125 also formats the collected data into the format required by the replay workstation 130 (and/or, more precisely in some cases, the replay engine) (e.g., preparing one or more event objects comprising data used to replay the requested event(s)). In other cases, the event object may be prepared in advance and/or stored in the data store on the storage server 120. and delivering the data, in some cases as an HTML response to a replay system running on the replay workstation 130 (as used herein, the term replay system denotes any hardware and/or software architecture used to replay events, which can include standalone applications, as well as, in an embodiment, a JavaScript-based replay engine running within a compatible web browser).

In some embodiments, a single replay server 125 can handle multiple concurrent requests from multiple replay workstations 130. Conversely, in some cases, a single replay workstation 130 might receive replay information (including without limitation event objects) from a plurality of replay servers 125. Optionally, in a set of embodiments, each replay workstation 130 (and/or a user thereof) is required to authenticate with the replay server 125 (and/or an associated server that handles authentication and/or access control tasks).

Figure 2:
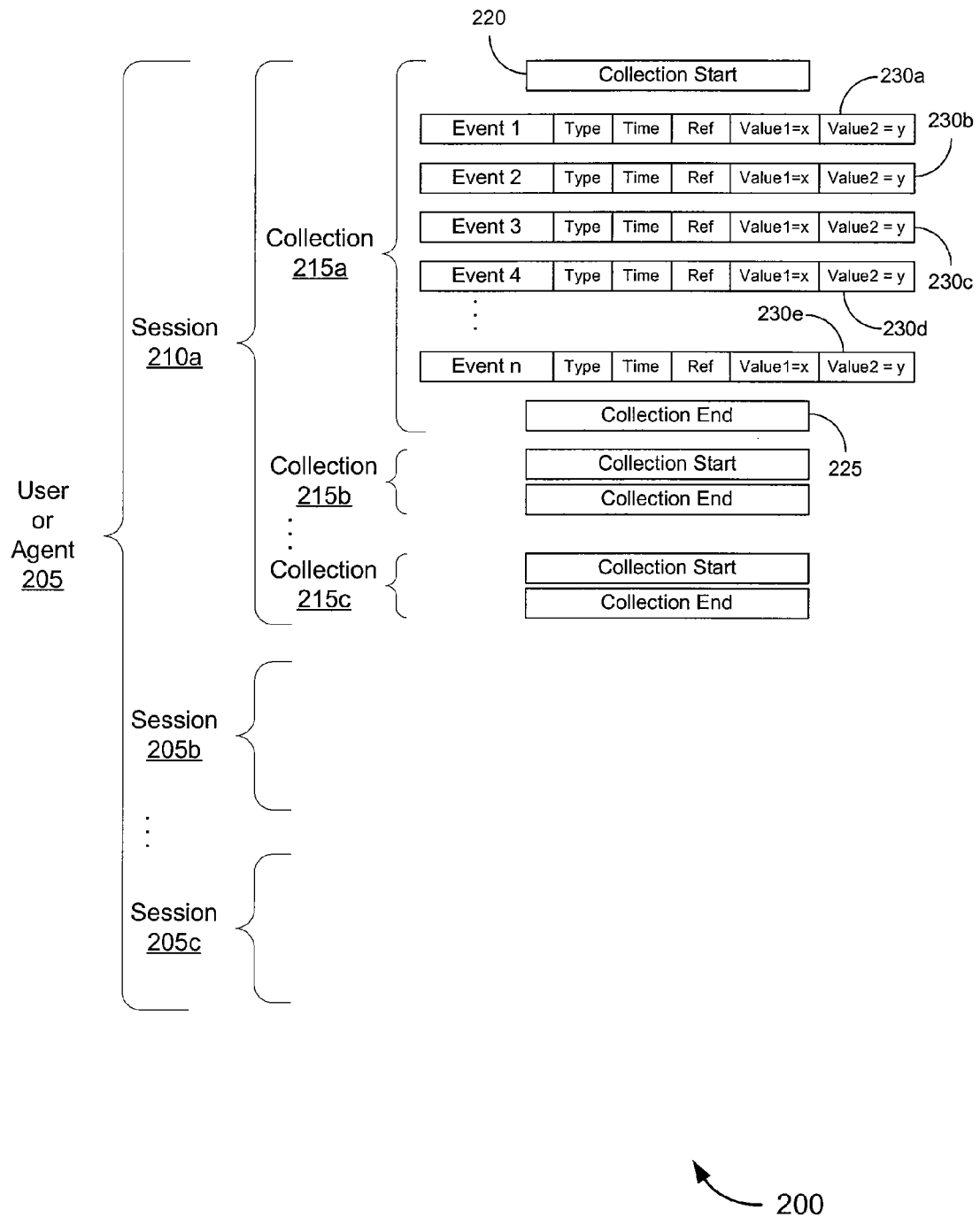
FIG. 2 is a generalized illustration of an exemplary data structure that can be used to organize and/or replay a plurality of events from a plurality of sessions, in accordance with various embodiments of the invention.

FIG. 2 provides an overview of one possible data structure 200 used to replay the collected information. In some cases, the replay server 125 is responsible for organizing the information into this format (and/or any other suitable format). In other cases, a representation of an event can be formatted and/or stored in the proper format by the monitoring server 105, monitoring agent on a client 110, storage server 120 and/or any other appropriate device. A replay observer (e.g., using a workstation 130) may request the replay of one or more sessions for one or more users or agents; the information provided to the replay observer by the replay server generally will follow an accepted format (such as that depicted by FIG. 2, to name but one example).

The exemplary data structure 200 comprises, in some embodiments a user/agent container 205, which is associated with a particular monitoring agent that collected a set of events and/or a user with which those events are associated. Within the user/agent container 205, there are a plurality of session containers 210, each of which comprises a one or more event collections 215. Each session 210 may connote a relationship between event collections 215 (e.g., each of the collections 215a, 215b, 215c may be related in some way, for example, each of the collections 215a, 215b, 215c may share a temporal relationship, may relate to a single application session, such as a web-browsing session, etc.). Merely by way of example, in a set of embodiments, a session might comprise an arbitrary set of event collections that represent a chronological series of collections. A new session may be declared following an extended period of user inactivity.

Each event collection 215 may have a collection start record (and/or header) 220, a collection end record (and/or trailer) 225 and/or one or more event records 230. An event collection (also referred to herein simply as a "collection") comprises a set of events that have some relationship. Merely by way of example, in a particular embodiment, if a user of a monitored computer engages in a web-browsing session, an event collection might comprise an arbitrary set of collected user activity that starts with a newly delivered page to the user's client machine and includes all of the user keyboard, mouse and other activities that are associated with the displayed page before the next change of displayed page content.

Figure 3:
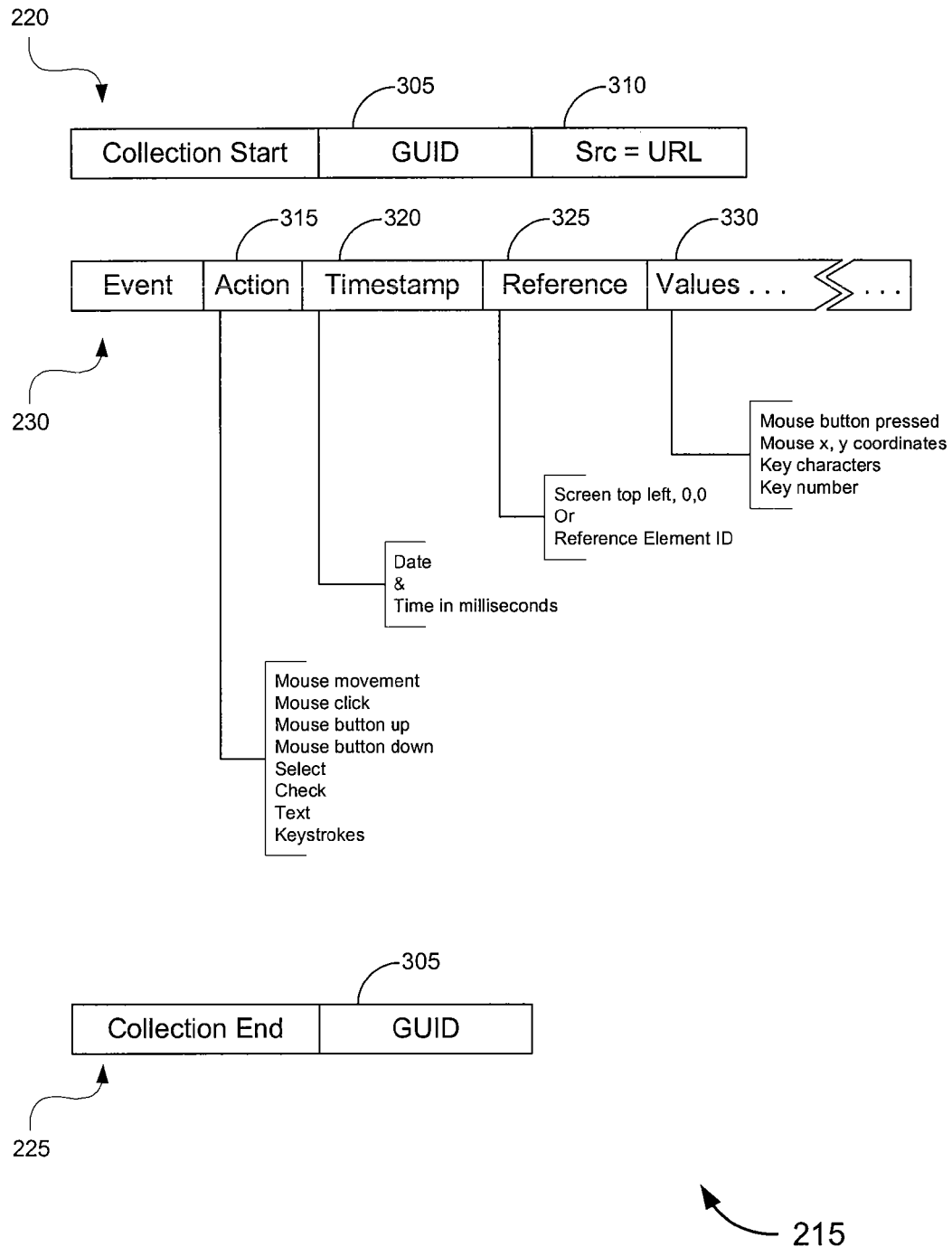
FIG. 3 is a detailed illustration of an exemplary data structure for a collection of events, in accordance with various embodiments of the invention.

FIG. 3 provides further detail about the data structure for an individual collection 215 a session 210, in accordance with a set of embodiments. The collection start record 225 may include a separate identifier, such as a GUID value 305 for each collection 215. (One skilled in the art will appreciate that a GUID (or globally unique identifier) generally comprises an identifier value that is globally unique, either within the replay system and/or generally. One commonly known GUID mechanism is an implementation by Microsoft Corp. of the Universally Unique Identifier (UUID) standard. It is a pseudo-random number drawn from a universe of $2^{128}$ that is so large that the chance of creating two identical GUIDs is vanishingly small.) For purposes of this disclosure, the GUID can be any value that is sufficient to uniquely identify a particular collection from among the plurality of collections maintained by a monitoring and replay system.

The collection start record may also comprise a reference 310 (such as a URL) that is used by the replay workstation to retrieve from the replay server the HTML page content that starts out a replay collection. In some cases, the HTML content will represent a web page visited by a user of the monitored computer when the events were generated. In other cases, the HTML content may serve to emulate another application (such as an email application) that generated the events. Hence, in some cases, the HTML content can provide a "background" or context for the replayed events.

It should be noted, however, that in many cases, the events will interact with this background (such as the selection of a URL in the HTML page, etc.). Hence, in a set of embodiments, some or all of the HTML page elements presented at the start of a collection that are capable of being the object of a user event are assigned an index number that is unique within this collection. These assigned element numbers are used by the event objects as a reference point for resolving where on the screen to replay the events.

This HTML content may, for example, be used as a source URL for a content window, as described above. In many cases, a collection is terminated by a collection end record 225 (which might also include the identifier 305). A possible exception in the case of an "open/running" collection, where no collection end record will have yet been created. That is, embodiments of the invention support the replay of an event collection even while events in the collection are still being collected from a monitored computer.

An HTML page associated with the start of a collection, when originally collected by the agent may have resulted from more than one HTTP request; this is typically the case where an HTML page has embedded images and/or other sources of page content. The replay server might resolve some or all of these subordinate data sources, obtain (e.g., from the originally-referenced data sources) and/or store copies of the embedded images and/or content. The replay server might further modify the URL references in the pages presented by the collection start record such that all HTML page content (including embedded images and/or content) is served by the replay server, avoiding the need to re-access any HTML page content from original data sources. As noted above, this mitigates the danger that such content may have been modified (and/or become unavailable) in the time between the collection of the event and the replay of the event.

In a set of embodiments, the replay server also removes any embedded JavaScript, VBScript or other embedded dynamic logic from pages presented for replay to avoid any uncontrollable browser behavior during replay. As noted above, any embedded external links that were present within the original collected data may be modified to redirect them back to the replay server for resolution, avoiding the need for the replay workstation to access the interne. Removal of external links and/or active page content (such as JavaScript) can be provided as options for any given replay request.

Within each collection there is a series of one or more events 230 (or, more properly representations of events that occurred on the monitored client), which comprise a record of some or all screen-related activities performed by the monitored user within the collection (as well as other system and/or application events). In a particular embodiment, events may be sorted in ascending chronological order (e.g., by timestamp). In many cases, events consist of one or more actions 315, including, merely by way of example, keyboard and mouse actions. For instance, an event might contain the keystrokes and/or text resulting from keyboard activity and/or mouse coordinates, mouse button and action associated with mouse activity. An event record 230 might further comprise additional information, including without limitation one or more a timestamps 320, position references 325 (either by absolute screen position, reference element ID, etc.) and/or a set of one or more values associated with the actions 330 (keystroke characters, mouse coordinates, etc.).

Figure 4:
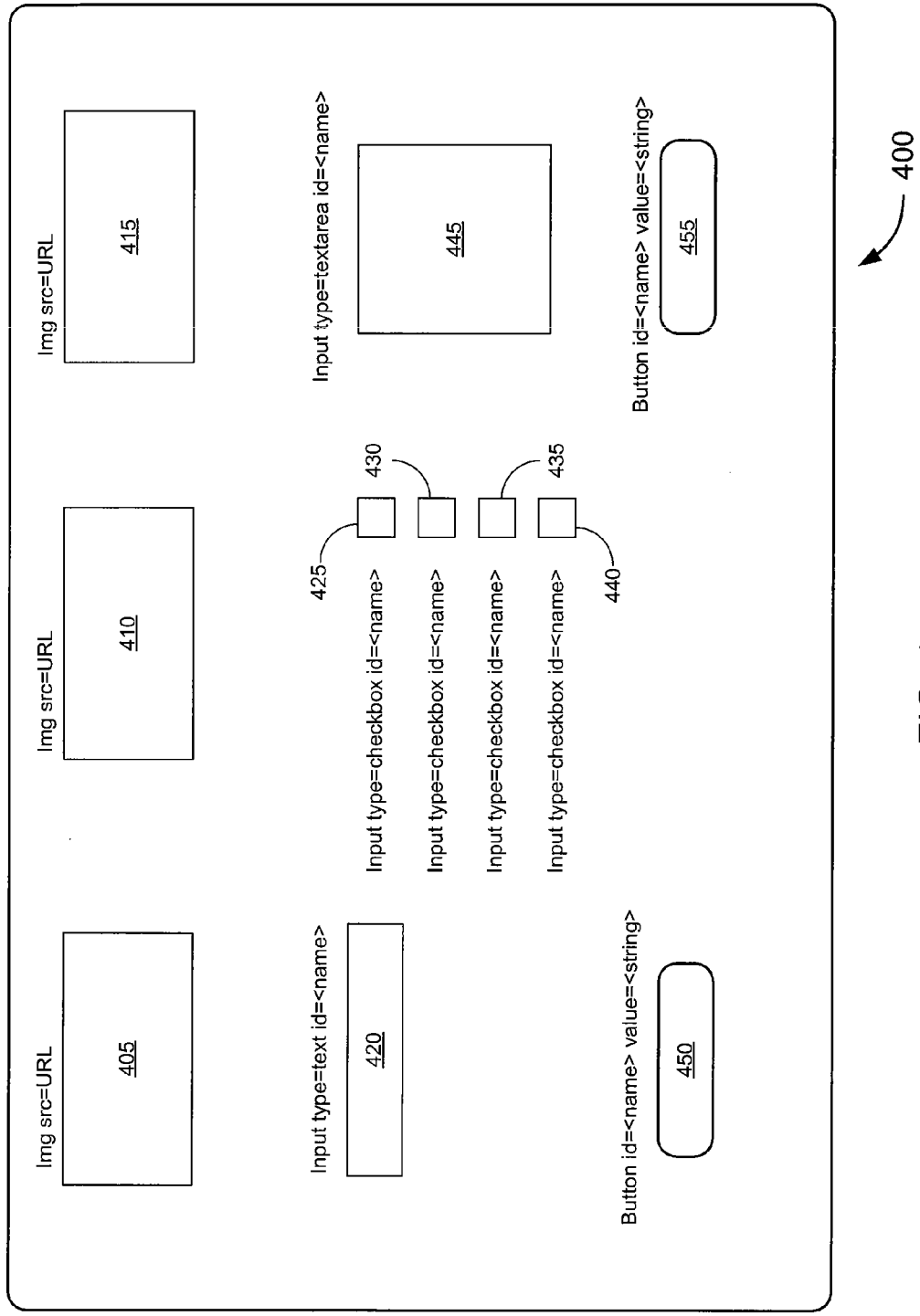
FIG. 4 illustrates, in a generalized form, an exemplary HTML page that is referenced by one or more replayed events, in accordance with various embodiments of the invention.

FIG. 4 shows an exemplary HTML page diagram 400 where a number of active elements 405-455 on the page for a collection have each received a unique element index within the collection. For events that have activity that was associated with a particular modifiable HTML element, the coordinates for the activity may be recorded as relative to the position of the indexed HTML element; for events that are not associated with a modifiable HTML element, the events may be recorded relative to the top left hand corner of the screen display area.

As an example if the user used the mouse button to check the check boxes for elements 425 and 435, the coordinates for the mouse click events would reference the elements 425 and 435 respectively. The user's mouse movement events to track across the screen to get to the check boxes 425 and 435 would be recorded relative to the top left coordinates of the displayed page.

This technique permits positioning of text, mouse actions and check box or radio button activities very accurately within the HTML elements to which the refer, providing a superior quality of replay experience. General mouse movements and actions not related to specific HTML elements are replayed using the general coordinates of the displayed page as the reference point for the replay.

Figure 5:
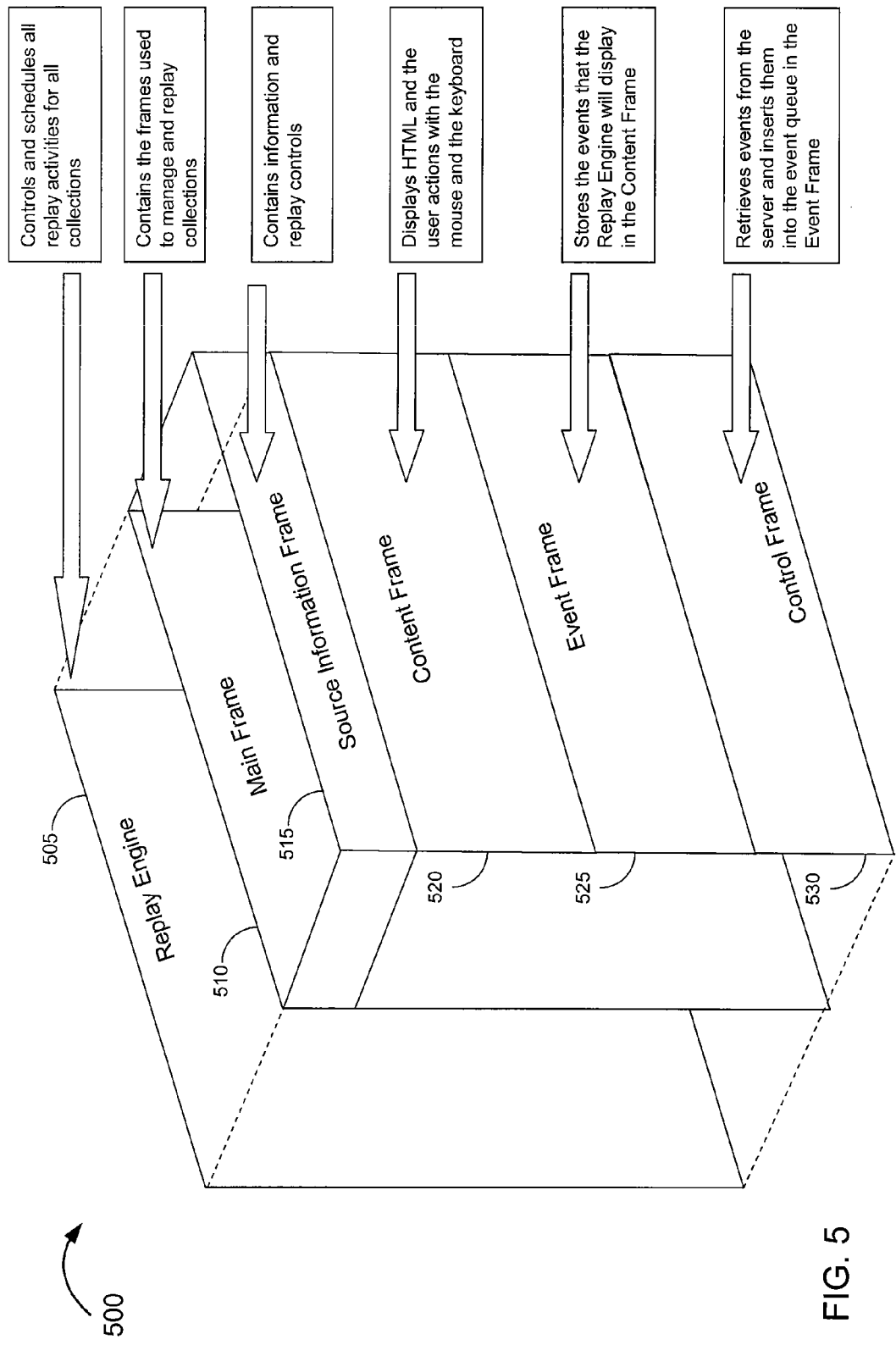
FIG. 5 is a functional diagram illustrating software components of a replay system on a replay workstation, in accordance with various embodiments of the invention.
Figure 6:
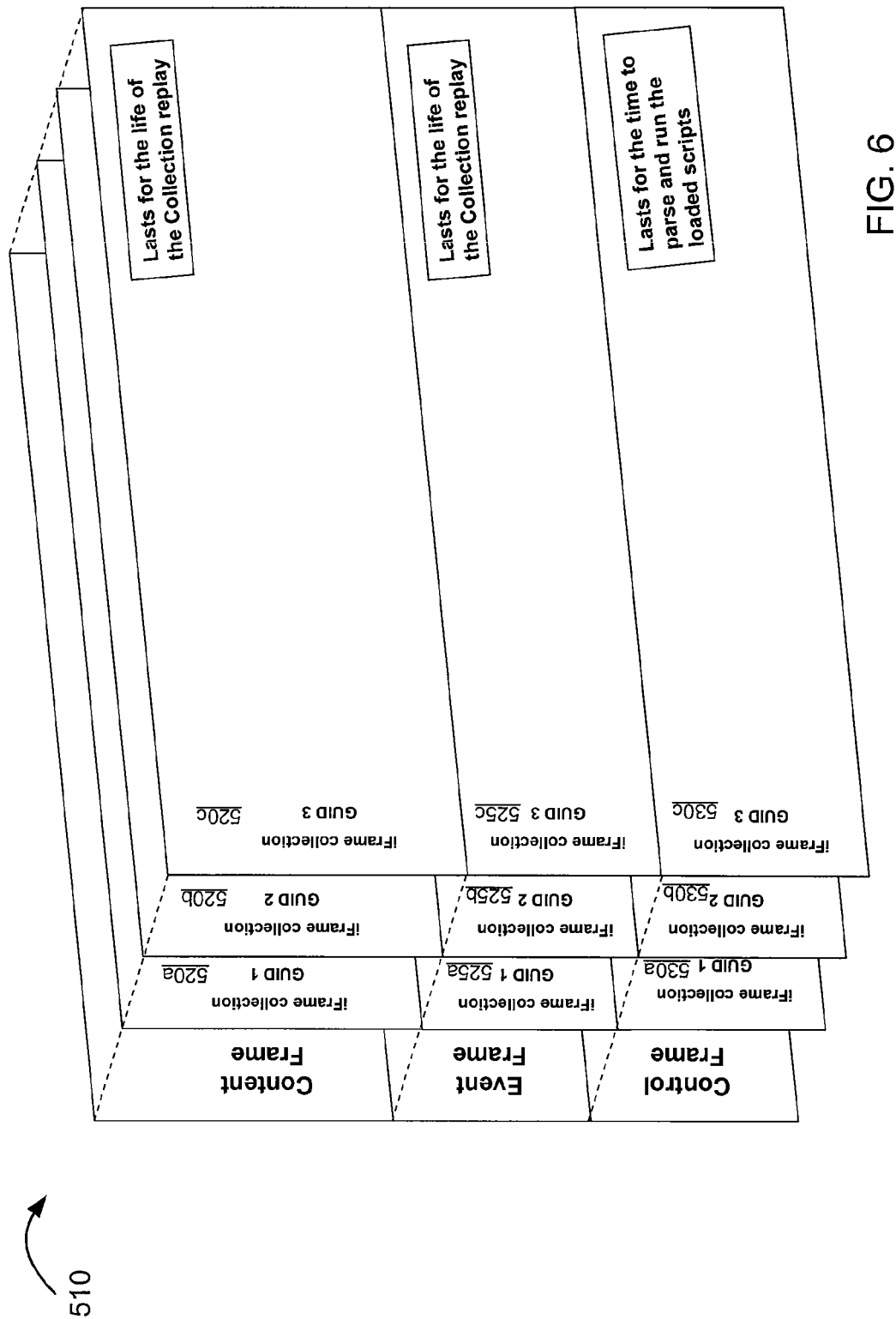
FIG. 6 is a functional diagram illustrating a system of windows that can be used to replay a set of events on a replay workstation, in accordance with various embodiments of the invention.
Figure 7:
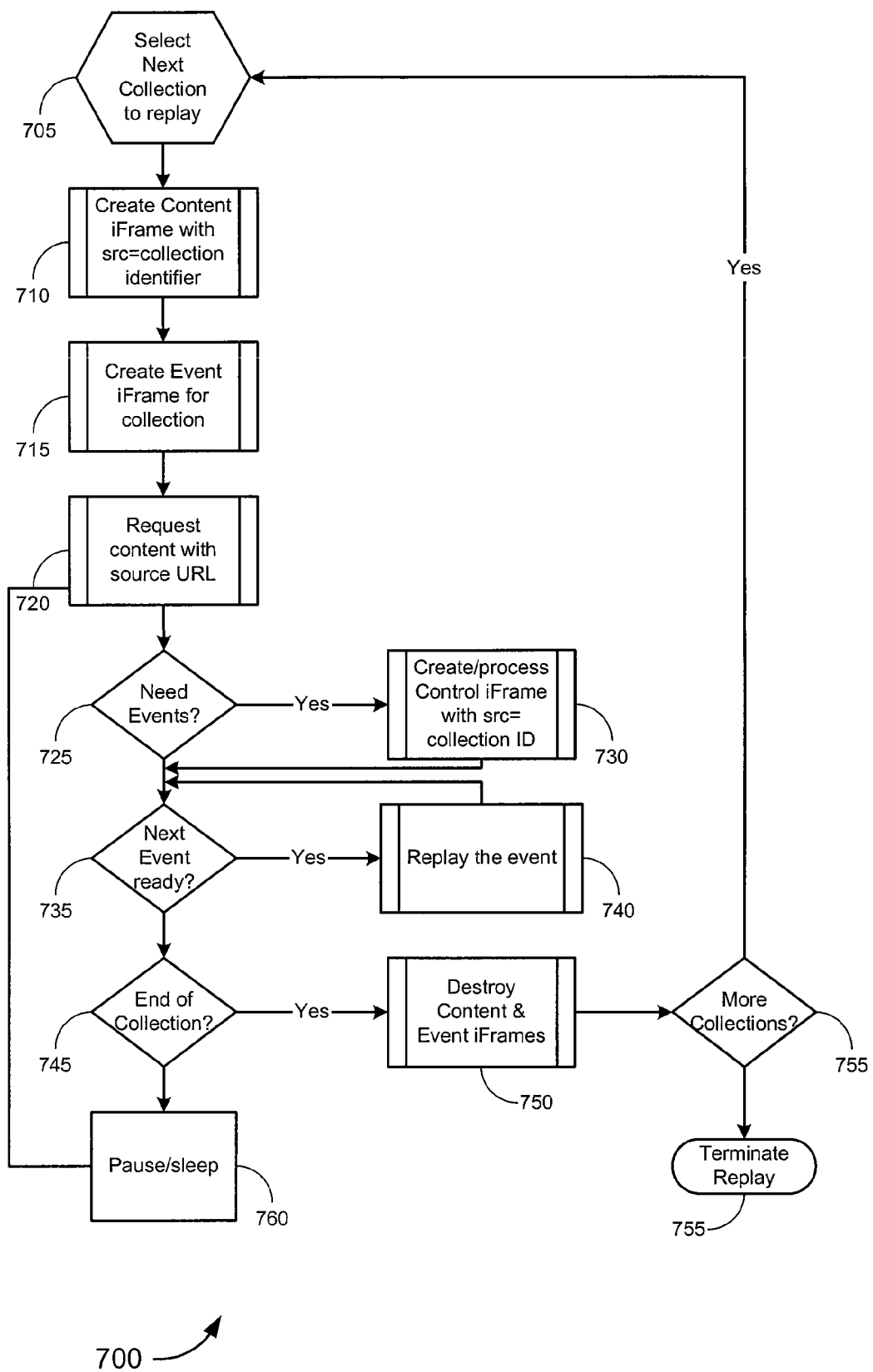
FIG. 7 is a process flow diagram illustrating a method of replaying a set of events, in accordance with various embodiments of the invention.

As described generally above, various embodiments of the invention may use a plurality of windows (including a control window, an event window, a content window and/or a source information window) to provide replay services. Also as described above, in a particular set of embodiments, these windows may be implemented as JavaScript iFrames familiar to those skilled in the art. FIGS. 5-7 illustrate how such iFrames may be implemented, in accordance with several embodiments of the invention. (Once again, it should be noted that, while iFrames provide one way to implement the invention, other embodiments may use different mechanisms.)

FIG. 5 thus illustrates functionally the major components that comprise a replay system 500 that is instantiated on a replay workstation when replay is requested, in accordance with one set of embodiments. The replay system 500 comprises a replay engine 505, which, as described, comprises all of the JavaScript functionality that controls the course of the replay. (Also as noted above, the replay engine 505 may be a JavaScript that is downloaded by the workstation upon requesting the replay of an event. A container frame 510, labeled Main Frame in FIG. 5, may be instantiated by the replay engine.

Within the main frame 510, a source information frame 515 is instantiated. The source information frame 515 provides the replay observer with meta information about the collections being replayed. As noted above, the source information frame may also provide positioning and/or speed controls that enable the replay observer, inter alia, to proceed forward, backward, fast forward and fast backward, pause, as well as speed up or slow down the rate of replay.

In the embodiments illustrated by FIG. 5, a replay observer has requested the replay of an event collection within a single session. For each collection to be replayed, the replay engine 505 instantiates a content iFrame 520, an event iFrame 525 and/or a control iFrame 530, which are used to manage the replay of the content and the events for a single collection. Each of these iFrames performs a specific function during replay and each receives a unique name that incorporates the identifier (e.g., GUM) of the collection that is being replayed.

In a set of embodiments, the content iFrame 520 is used to contain the visible HTML page contents being replayed; it is also the canvas upon which event objects are replayed, to show to the replay observer the actions undertaken by the user of the monitored client.

The event iFrame 525 is used to contain an event queue (which may be chronologically ordered) of the event objects. The replay engine 505 uses the event objects in this event queue and replays them sequentially into the content iFrame 520. As events are replayed, the replay engine 505 advances the conceptual collection replay position pointer down the event queue in the event iFrame 525.

The control iFrame 530 is, in some embodiments, an ephemeral iFrame. (In other embodiments it may be persistent.) When the replay engine 505 determines that more events are required for the current collection being replayed, a new control iFrame 530 may be instantiated with a 'src' parameter that resolves to the replay server. The replay server responds with an HTML page that consists of JavaScript statements that add a series of event objects to the end of the event queue within the event iFrame 525 for the collection. In a set of embodiments, each control iFrame 530 is destroyed at the completion of adding its list of events to the end of the queue. (As noted above, in some cases, the control iFrame 530 may be persistent, such that the replay engine 505 just feeds a new src parameter to an existing control iFrame 530 to obtain more event objects.

FIG. 6 illustrates how the replay engine creates multiple sets of these iFrames for a plurality of collections, in accordance with another set of embodiments. (In FIG. 6, each set of iFrames represents a layer in the stack.) In an aspect of some embodiments, all of the sets of iFrames may be contained within the main iFrame 510. All of the events for each of the contemporaneous collections may be replayed in their strict timestamp order, thus preserving a chronological relationship between the events in the various collections. In an aspect, as the events being replayed will happen across different collections, the replay engine 505 will switch the replay focus to the content iFrame (e.g., 520*a*) for the appropriate collection, bringing that content iFrame to the top of the browser's window stack. This feature can be used to faithfully reproduce for the replay observer the overlapping windows and switching between the windows in the same sequence as performed by the original user on the monitored client workstation.

Otherwise, the retrieval, replay and processing of the events for each of the contemporaneous collections might proceed in the same manner described with respect to FIG. 5.

In some cases, if there might be so many contemporaneous collections to be replayed that it would become confusing for the replay observer, an option is presented that allows the replay observer to replay all collections in a sequential manner, in the order that each collection started and completing the replay of one collection before starting the next collection, regardless of whether the collections were actually contemporaneous. In this case, the replay process appears as described with respect to FIG. 5 above, where each collection is replayed to its completion before starting the to replay a subsequent collection.

FIG. 7 is a process flow diagram illustrating a method 700 of providing replay services, in accordance with various embodiments of the invention. In particular embodiments, the method 700 may be performed by a replay server and/or replay workstation, and the method 700 is described in particular with respect to the replay system described above with respect to FIGS. 5 and 6. (It should be noted, however, that methods of the invention are not limited to any particular structural or functional architecture.) FIG. 7 thus illustrates one exemplary process used by a replay engine to control the replay of a single collection of events. (One skilled in the art will appreciate, based on the disclosure herein, that the method 700 of FIG. 7 easily can be modified to accommodate the replay of multiple collections and/or sessions, as described above with respect to FIG. 6, for example.

In a set of embodiments, when a user requests the replay of an event and/or collection (for example, by selecting a link for the event/collection in a browser), the link refers to a JavaScript on the replay server comprising the replay engine. The replay engine thus is downloaded by the browser and begins to execute in the browser's JavaScript processor. Once running, the replay engine inspects the session data structure and selects the relevant collection to replay (block 705). In some embodiments, the link selected by the user may include one or more additional parameters referring to the selected collection, such that the parameters are used as an initial input to the replay engine to instruct the replay engine which event collection/event should be selected. (Other methods of instructing the replay engine are possible as well. Merely by way of example, a set of controls may be provided within the replay engine to select an event/collection to replay.)

In this described embodiment, this is the start of a collection replay, so the first record encountered in the collection generally will be the collection start record and will include the identifier (e.g., GUID) for this collection. The replay engine now performs two major functions: it creates a content iFrame (block 710) (and, in an embodiments, specifies the source for this iFrame with URL that references the replay server and the identifier for the collection). The replay engine also creates an event iFrame (block 715) that will be used for containing event objects (e.g., via an event queue, as described above) for the events to be replayed. Both the content iFrame and the event iFrame may the collection identifier as a means for providing unique names.

As the collection content iFrame was created with a 'src' parameter in the described embodiment, the browser generally will proceed to request a set of content referenced by this URL into the iFrame (block 720). In certain embodiments, this URL refers back to the replay server and/or supplies the collection identifier as part of the URL. The replay server interprets this URL request, gathers up the requested content and transmits it to the replay content iFrame as the response to the 'src' request. As noted above, content referenced by the source request might comprise background and/or contextual elements for the events to be replayed (including, merely by way of example, some or all of the original HTML page contents, if the event occurred with respect to a web page in a web browser, and/or a set of HTML (and/or other graphical and/or textual elements) emulating another application in which the event(s) occurred, etc.).

The replay engine now proceeds to look for events that are to be replayed for the current collection. The replay engine determines if more events objects are needed to replay events in the current collection (block 725), for example, by looking at an event queue (which again, may be, but is not necessarily, chronologically ordered), which may be contained in the collection's event iFrame. At the start of replay for a collection there are no events objects yet retrieved so the answer to this test generally will be "yes," as events are needed. At other times the replay engine might assess the current speed of replay, number of events remaining to be replayed, and/or number of events remaining in the event queue to determine how many events need to be requested from the replay server. To retrieve more events objects, the replay engine may instantiate a new control iFrame (block 730). In some cases, the source URL for the control iFrame may be specified as a URL that references the collection identifier and/or resolves back to the replay server.

Once the control iFrame creation has been scheduled, the replay engine continues examining the event queue to see if the timestamp for the next event indicates that it is scheduled to replay (block 735). If yes, the event, is replayed, e.g., based on the instructions and/or parameters in the event object for that event (block 740; the event object (and/or the instructions/parameters it comprises), is removed from the event queue and the test repeated (block 735).

When there are no more events yet ready, the replay engine tests to see if the end of the collection has been reached (block 745). If so, then all of the iFrames associated with this collection are destroyed (block 750) and the replay engine tests to see if there are any more collections to be replayed for the current session (block 755).

If another collection awaits replay, the sequence is repeated by starting anew the creation of the content, event and control iFrames necessary for replaying the next collection. When there are no further collections to be replayed, the replay engine terminates the replay (block 755).

When there are no events ready for replay and it is not yet the end of the collection, the replay engine optionally may pause or sleep for a specified duration (such as one second, etc.) and/or until the time that the next event in the event queue is scheduled to be replayed (based, for example, on the respective timestamps of the event that was just replayed and the event that is next in the queue (block 760). This permits other events and activities in the replay browser window to proceed.

One of those processes that might proceed while the event replay loop pauses is determining whether more events are needed (block 725) and/or creation/processing of a control iFrame created to retrieve more replay events from the replay server for the current collection. As noted above, the control iFrame is created with its 'src' parameter referencing a URL that resolves to the replay server plus the identifier for the associated collection. The replay server responds by gathering up a set of the next events in sequence associated with the appropriate collection identifier.

Referring more specifically now to the operation of the control iFrame (block 730), in a set of embodiments, the replay server formats the response to the control iFrame 'src' parameter as an HTML page that contains a series of JavaScript event object actions. Each JavaScript event object action might take function by adding an event object to the event queue for the collection, which, as noted above, is contained by the event iFrame for the appropriate collection GUID.

In some cases, as the control iFrame receives the JavaScript contents that form the replay server's response, the HTML parser of the web browser and/or replay engine executes each of the JavaScript event object actions contained in the HTML response. When the control iFrame response has been fully received and parsed from the replay server, all of the JavaScript event objects will have been added to the event iFrame queue of events for the collection, and the control iFrame may be destroyed.

As noted above, in some cases, the parsing and processing of the JavaScript event objects received by the control iFrame occurs during the periods that the replay engine pauses between replaying events (block 760). One possible effect of this processing of the receipt of the response by the control iFrame (block 730) in this manner is that the event queue of events objects for replay, contained by the collection's event iFrame, is replenished as a background activity while the main replay loop is otherwise waiting.

In this fashion, the replay engine in some embodiments keeps replaying events from the collection's event queue, and scheduling replenishment of the event queue from the replay server by the creation of successive control iFrames, which are sourced from the replay server with a stream of JavaScript actions that insert event objects into the event queue.

When all events for a collection have been retrieved and replayed, the replay engine might destroy all objects and/or iFrames associated with the currently completed collection and looks for the next collection to be replayed. When all collections to be replayed have been exhausted, the replay engine ceases its replay activities and/or a user (i.e., replay observer) may request the replay of additional events and/or collections.

The above description describes how the replay engine handles the sequential replay of consecutive collections. When a user opens multiple concurrent browser windows or performs multiple concurrent tasks that are collected from the monitored client computer, the data structures and the replay engine may be capable of replaying these multiple collections contemporaneously.

Figure 8:
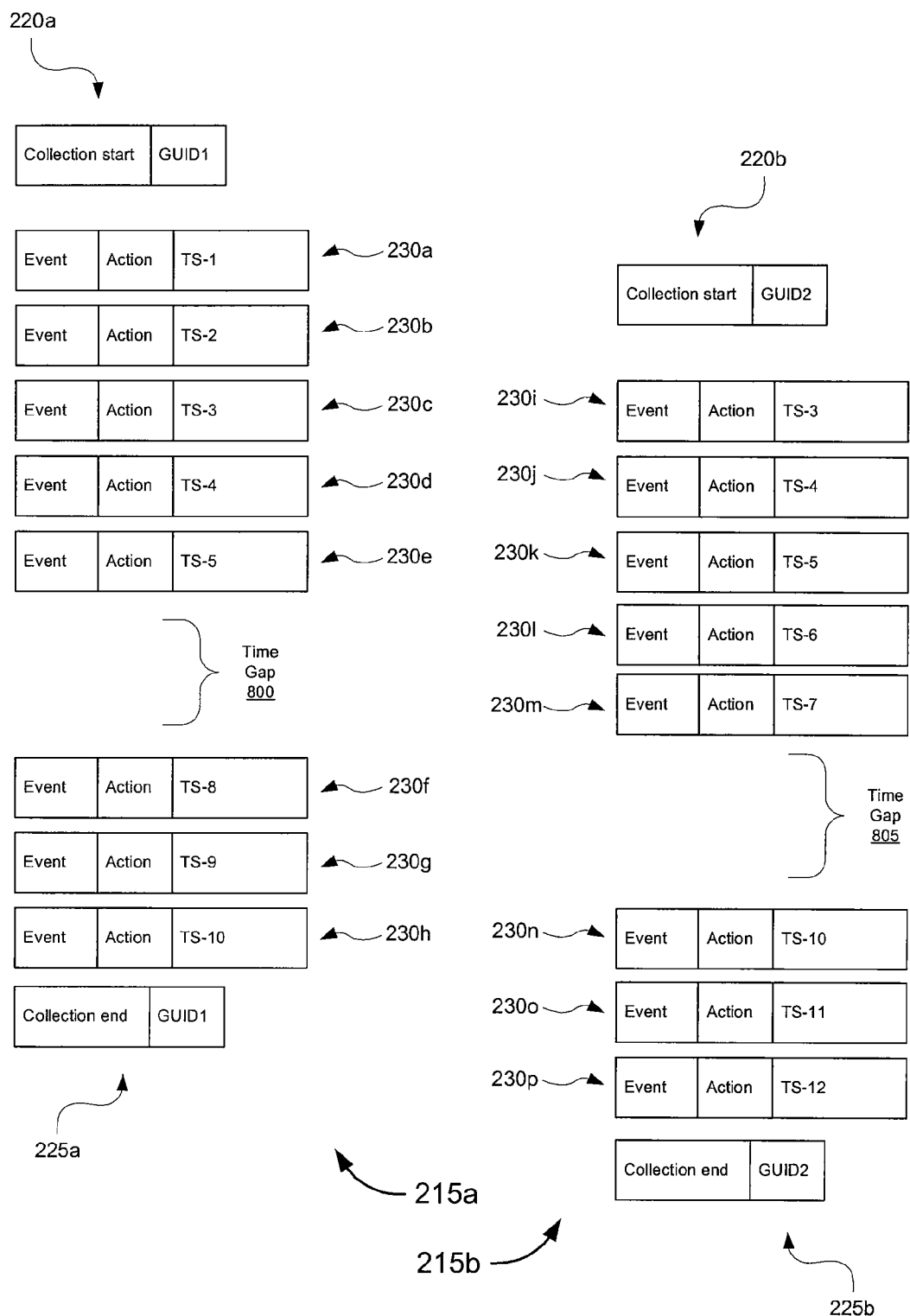
FIG. 8 is a generalized illustration of a set of data structures for a plurality of collections of events to be replayed.

FIG. 8 thus illustrates how successive user collections may overlap in time, in accordance with some embodiments, with the data structures for each successive collection and its list of user events overlapping in time. For example, a first collection 215a might comprise a set of events 230a-h, while a second collection 215b might comprise another set of events 230i-p. Notably, a number of respective events from each collection have corresponding time stamps, indicating that those respective events occurred contemporaneously on the monitored computer and therefore should be replayed contemporaneously (and/or at least apparently so to an observer). Merely by way of example, events 230c and 230i each have a timestamp of 3 (for ease of description, simplified timestamps are used in this example; as noted above, in many embodiments, more precise and/or absolute timestamps—such as a timestamp comprising a date and UTC time (in milliseconds, for instance)), while events 230h and 230n each have a timestamp of 10. Accordingly, events 230c and 230i should be replayed simultaneously (assuming that both collections 215 and 215b are being replayed), while events 230h and 230n should be replayed simultaneously. In this way, among others, embodiments of the invention can preserve a chronological relationship between events in two or more collections.

To accommodate this feature, the replay engine, using the replay logic described above, starts by instantiating the replay for the first collection 215a. When a second overlapping collection 215 is encountered for the same user, the replay engine instantiates content, event and control iFrames to handle this contemporaneous collection replay, and/or the replay engine controls the replay of events to ensure the synchronization of events (for example, in some cases the pause/sleep step (block 760) and/or the determination of whether the next event is ready (block 735) in the method 700 of FIG. 7 is used to accommodate one or more time gaps 800, 805 to maintain synchronization of events between collections).

Figure 9:
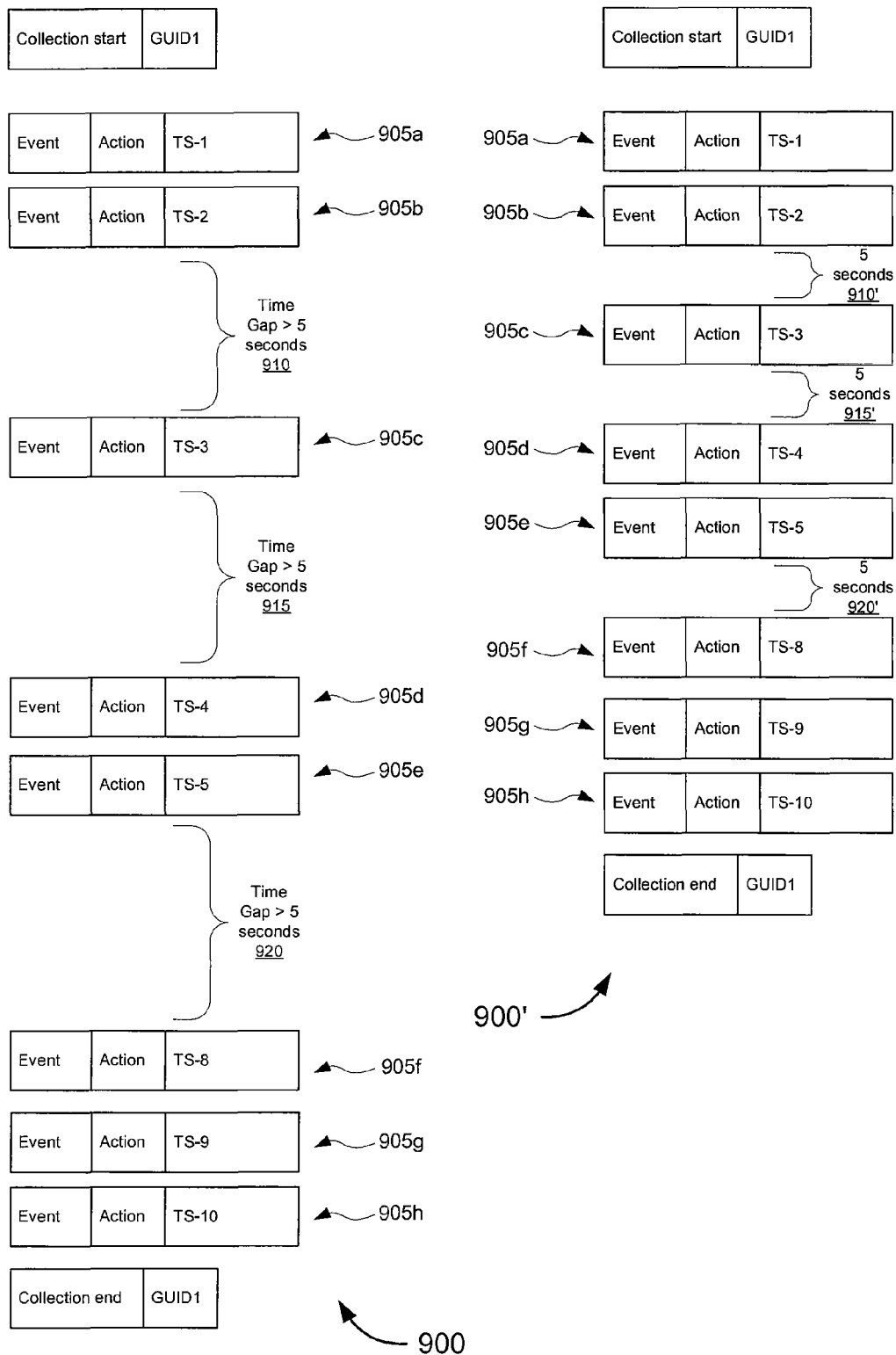
FIG. 9 is a timing diagram illustrating how various embodiments of the invention can be used to replay events in a shorter time duration then that of the original events.

FIG. 9 illustrates conceptually the replay of a collection 900 to exemplify a feature provided by some embodiments of the invention to reduce unnecessary delays in the replay of a collection. The collection 900 of comprises a series of events 905 where the user, from time to time, does not perform any activity (e.g., time gaps 910, 915, 920). This is quite typical in computer use. For instance, when browsing the web, a user who often will navigate to a page then pause to read the content before perhaps selecting a button, entering text, navigating to a new page, etc.

Hence, a series of time-ordered collected events within a collection may have significant inactivity gaps. In an embodiment of the invention, any gaps during replay greater than some threshold duration (which might be predefined, selected by a user, e.g., using a control in a source information window, etc. removed and/or reduced to the threshold duration (and/or another selected value) to speed up the replay experience for the replay observer. Merely by way of example, in the collection 900, time gaps 910, 915, 920 of greater duration than five seconds each are reduced to no more than five seconds (e.g., gaps 910', 915', 920' in collection 900', which illustrates the overall effect of reducing all inactivity gaps to a maximum of five seconds, considerably reducing the elapsed time for the replay observer to see all of the events within a given collection. (It should be noted that, while the collection container is used here for ease of depiction, many embodiments do not actually alter the structure of a collection when reducing time gaps).

The compression of time gaps may be accomplished in any appropriate way. Merely by way of example, in a set of embodiments, the replay engine, when pausing (block 760) and/or determining whether an event is ready for replay (e.g., at block 735), may be configured to determine whether a delay before the next event object exceeds a threshold duration, and if so, reduce the delay as described above. In a set of embodiments, the replay time compression feature described herein is applied to all collections of events that are replayed by the replay system. In another set of embodiments, the feature is provided as a user-selectable option (perhaps via a control in a source information window), allowing the user to view the events according to the timing of the original events (to see, for example, how long a user paused on a particular page before navigating to another page). In yet other embodiments, when the time compression feature is employed, a notice (e.g., via a status message in a source information window, a pop-up window, etc.) may be provided to the observer that a time gap has been compressed.

Figure 10:
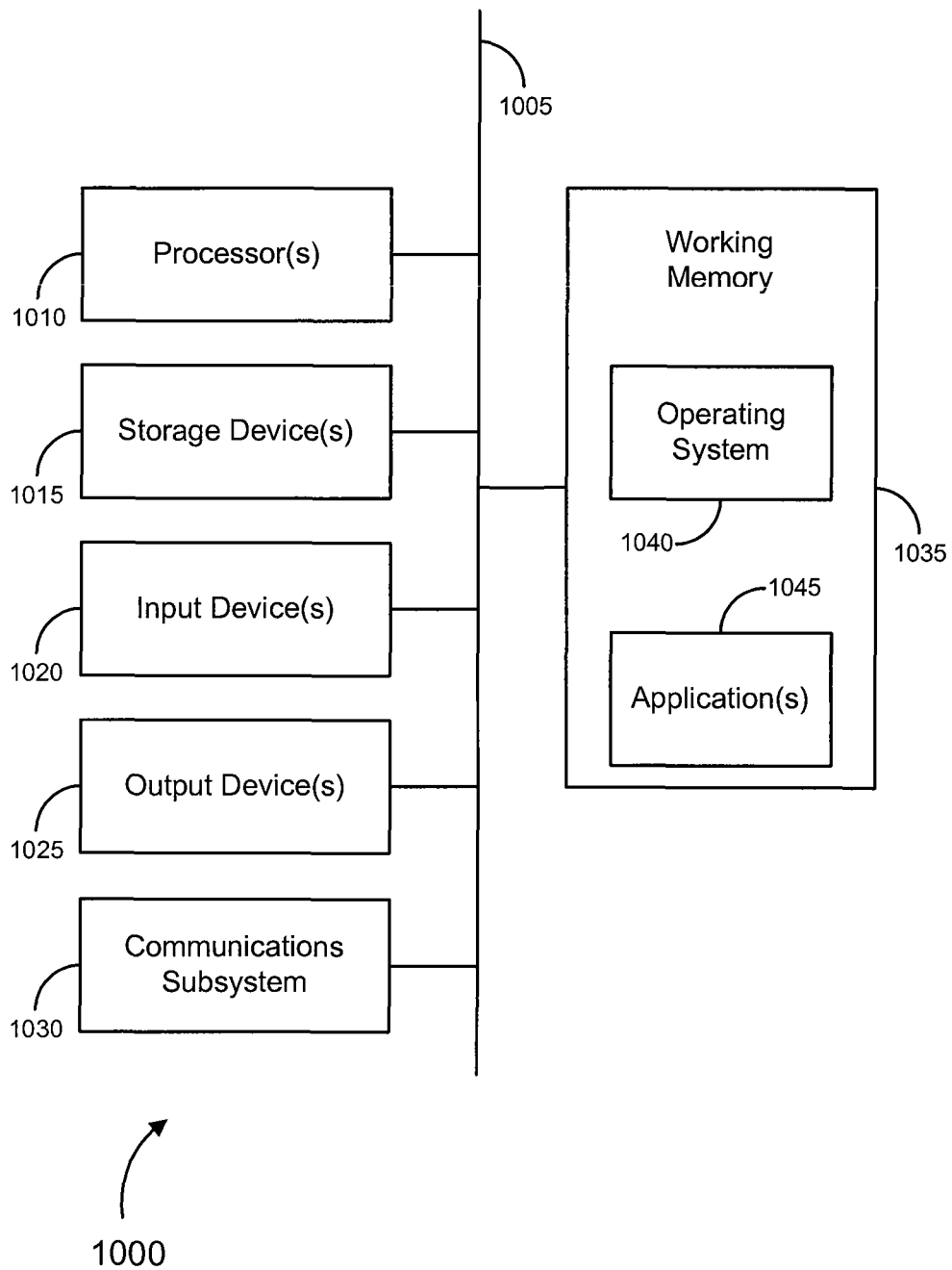
FIG. 10 is a generalized structural diagram illustrating the architecture of a computer system that can be used in various embodiments of the invention.

FIG. 10 provides a generalized schematic illustration of one embodiment of a computer system 1000 that can perform the methods of the invention and/or the functions of computer, such as the computers 105, 110, 120, 125, 130 described with respect to FIG. 1 above. FIG. 10 is meant only to provide a generalized illustration of various components, any of which may be utilized as appropriate. The computer system 1000 can include hardware components that can be coupled electrically via a bus 1005, including one or more processors 1010; one or more storage devices 1015, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 1005 can be one or more input devices 1020, which can include without limitation a mouse, a keyboard and/or the like; one or more output devices 1025, which can include without limitation a display device, a printer and/or the like; and a communications subsystem 1030; which can include without limitation a modem, a network card (wireless or wired), an infra-red communication device, and/or the like).

The computer system 1000 also can comprise software elements, shown as being currently located within a working memory 1035, including an operating system 1040 and/or other code 1045, such as an application program as described above and/or designed to implement methods of the invention. The operating system can be virtually any appropriate operating system, including without limitation any of the various varieties of Microsoft Windows™, Apple Macintosh OS™, UNIX™ (and/or any derivative operating systems, such as BSD, Linux, etc.), and/or the like, as well as, in some cases, task-specific and/or embedded operating systems.

In a set of embodiments, then, the computer system 1000 can be a PC, a server, a minicomputer, a mainframe computer, and/or a collection of any of the above. Those skilled in the art will appreciate that substantial variations may be made in accordance with specific embodiments and/or requirements. For example, customized hardware might also be used, and/or particular elements might be implemented in hardware, software (including portable software, such as applets), or both.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method comprising:
    collecting a plurality of events in response to user interactions with a client computer;
    generating a plurality of event objects each comprising data usable in replaying one of the plurality of events, the plurality of event objects comprising:
        a first event object corresponding to a first event of the plurality of events; and
        a second event object corresponding to a second event of the plurality of events; and
    modifying the second event object by replacing a first reference to a first resource at a first address with a second reference to a second resource at a second address different from the first address, the second resource being a representation of the first resource;
    storing the second event object in computer-readable memory accessible to a replay server; and
    storing the second resource in the computer-readable memory accessible to the replay server, such that the second resource is addressable by the replay server using the second address for replay at a replay workstation of a representation of the second event.

2. The method of claim 1, wherein:
    the first address comprises a first URL;
    the second address comprises a second URL; and
    the first resource comprises an image file.

3. The method of claim 1, further comprising:
    determining that the first event object comprises extraneous code;
    modifying the first event object by removing the extraneous code from the first event object; and
    storing the first event object in computer-readable memory accessible to the replay server.

4. The method of claim 1, further comprising streaming the first event object to the replay workstation before storing the second event object, the first event object comprising data used to replay a representation of the first event at the replay workstation.

5. The method of claim 1, further comprising receiving comprising:
    receiving a selection of the plurality of events for replay;
    in response to the selection, accessing the plurality of event objects from the computer-readable memory accessible to the replay server; and
    transmitting the accessed plurality of event objects for replay at the replay workstation of a representation of the plurality of events.

6. The method of claim 1, further comprising:
determining that a subset of the plurality of events are each related to particular user interactions with the client computer;
logically grouping the subset of the plurality of events as an event collection; and
storing data representing the logical grouping of the subset of the plurality of events as the event collection, the data stored in computer-readable memory accessible to the replay server.

7. The method of claim 1, wherein the user interactions with the client computer comprise interactions with an object of the client computer that is not part of a web browser.

8. The method of claim 1, wherein the replay server comprises the replay workstation.

9. The method of claim 1, further comprising:
identifying the plurality of events as events to replay;
instantiating at the replay workstation a control window for requesting the plurality of event objects;
requesting, via the control window, the plurality of event objects;
instantiating an event window for storing the plurality of event objects;
storing each of the plurality of event objects in the event window;
instantiating a content window configured to replay a representation of the plurality of events; and
replaying the representation of the plurality of events using the plurality of event objects stored in the event window.

10. The method of claim 9, wherein replaying the representation of the plurality of events comprises compressing a set of chronological gaps between the plurality of events, such that the replay of the plurality of events occurs in a relatively shorter span of time than a span of time in which the events occurred on the client computer.

11. The method of claim 9, wherein each of the plurality of events originally occurred within a single application on the client computer.

12. The method of claim 9, wherein the control window is configured to detect that a particular event object stored in the event window is being used to replay an associated event, and to request an additional event object in response to detecting that the particular event object stored in the event window is being used.

13. The method of claim 9, wherein the event window comprises an ordered list descriptive of the user interactions to which the plurality of events are responsive.

14. A non-transitory computer-readable medium encoded with logic, the logic operable when executed to:
collect a plurality of events in response to user actions;
generate a plurality of event objects each comprising data usable in replaying one of the plurality of events, the plurality of event objects comprising:
a first event object corresponding to a first event of the plurality of events; and
a second event object corresponding to a second event of the plurality of events; and
modify the second event object by replacing a first reference to a first resource at a first address with a second reference to a second resource at a second address different from the first address, the second resource being a representation of the first resource;
store the second event object in computer-readable memory accessible to a replay server; and
store the second resource in the computer-readable memory accessible to the replay server, such that the second resource is addressable by the replay server using the second address for replay at a replay workstation of a representation of the second event.

15. The medium of claim 14, the logic further operable when executed to:
determine that the first event object comprises extraneous code;
modify the first event object by removing the extraneous code from the first event object; and
store the first event object in computer-readable memory accessible to the replay server.

16. The medium of claim 14, the logic further operable when executed to:
stream the first event object to the replay workstation before the second event object is generated, the first event object comprising data used to replay a representation of the first event at the replay workstation.

17. The medium of claim 14, the logic further operable when executed to:
receive a selection of the plurality of events for replay;
in response to the selection, access the plurality of event objects from non-transitory computer-readable memory accessible to the replay server; and
output the accessed plurality of event objects for replay at the replay workstation of a representation of the plurality of events.

18. The medium of claim 14, the logic further operable when executed to:
determine that a subset of the plurality of events are each related to one of the user actions;
logically group the subset of the plurality of events as an event collection; and
store data representing the logical grouping of the subset of the plurality of events as the event collection, the data stored in non-transitory computer-readable memory accessible to a replay server.

19. The medium of claim 14, wherein the user interactions with the client computer comprise interactions with an object of the client computer that is not part of a web browser.

20. The medium of claim 14, wherein the replay server comprises the replay workstation.

21. The medium of claim 14, wherein each of the plurality of events originally occurred within a single application on a client computer.

22. The medium of claim 14, the logic further operable when executed to:
identify the plurality of events as events to replay;
instantiate at the replay workstation a control window for requesting the plurality of event objects;
request, via the control window, the plurality of event objects;
instantiate an event window for storing the plurality of event objects;
store each of the plurality of event objects in the event window;
instantiate a content window configured to replay a representation of the plurality of events; and
replay the representation of the plurality of events using the plurality of event objects stored in the event window.

23. The medium of claim 22, wherein the logic is operable to replay the representation of the plurality of events by compressing a set of chronological gaps between the plurality of events, such that a replay of the plurality of events occurs in a relatively shorter span of time than a span of time in which the events occurred on the client computer.

24. The medium of claim 22, wherein the logic is further operable when executed to detect that a particular event object stored in the event window is being used to replay an associated event, and to request an additional event object in response to detecting that the particular event object stored in the event window is being used.

25. The medium of claim 22, wherein the event window comprises an ordered list descriptive of the user interactions to which the plurality of events are responsive.

* * * * *

UNITED STATES PATENT AND TRADEMARK OFFICE
CERTIFICATE OF CORRECTION

| | | |
|---|---|---|
| PATENT NO. | : 9,154,365 B1 | Page 1 of 1 |
| APPLICATION NO. | : 11/556968 | |
| DATED | : October 6, 2015 | |
| INVENTOR(S) | : Brent E. Henry | |

It is certified that error appears in the above-identified patent and that said Letters Patent is hereby corrected as shown below:

In the Specification

In column 4, line 42, delete "even" and insert --event--, therefor

In column 11, line 50, delete "Mother" and insert --Another--, therefor

In column 12, line 27, delete "120" and insert --105--, therefor

In column 12, line 37, delete "reference," and insert --reference.--, therefor

In column 14, line 20, after "215", insert --within--, therefor

In column 15, line 19, delete "interne." and insert --internet.--, therefor

In column 16, line 36, delete "GUM)" and insert --GUID)--, therefor

Signed and Sealed this
Sixteenth Day of February, 2016

Michelle K. Lee
*Director of the United States Patent and Trademark Office*